P. ZAWADZKI.
CLAMP.
APPLICATION FILED OCT. 17, 1911.
1,044,620.
Patented Nov. 19, 1912.
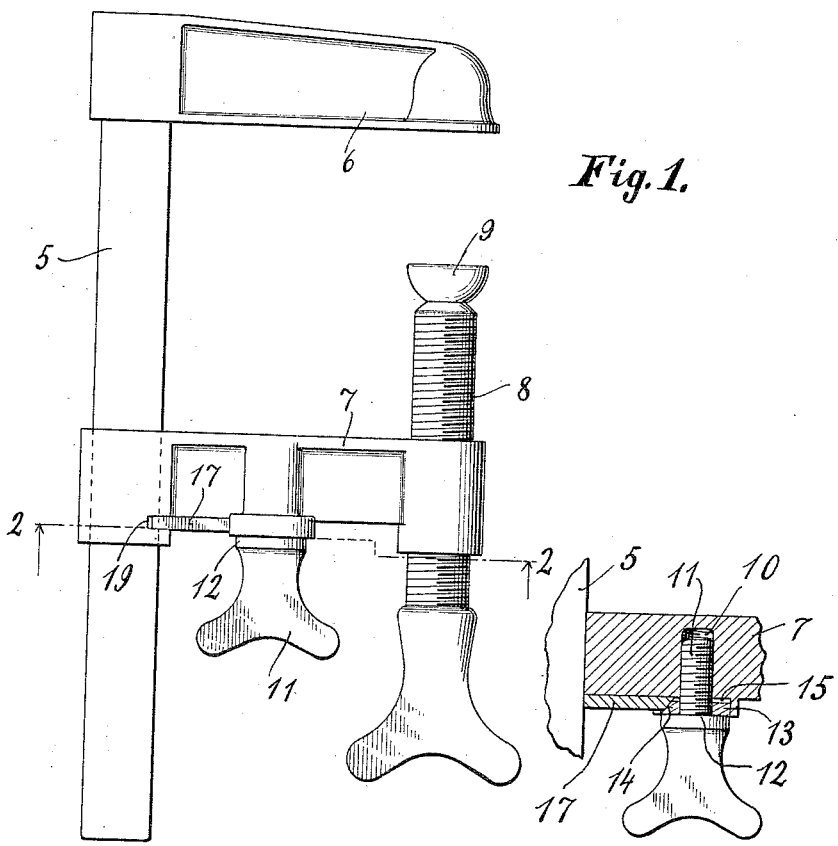
Fig. 1.
Fig. 3.
Fig. 2.
WITNESSES:
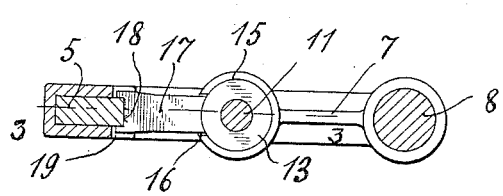
INVENTOR
Peter Zawadzki.
BY
ATTORNEYS.

UNITED STATES PATENT OFFICE.

PETER ZAWADZKI, OF CHICAGO, ILLINOIS.

CLAMP.

1,044,620.   Specification of Letters Patent.   Patented Nov. 19, 1912.

Application filed October 17, 1911. Serial No. 655,170.

*To all whom it may concern:*

Be it known that I, PETER ZAWADZKI, subject of the King of Austria, residing at Chicago, in the county of Cook and State of Illinois, have invented certain new and useful Improvements in Clamps, of which the following is a specification.

The clamp which is the subject of the present invention is designed more particularly for use in woodworking operations, although it is not limited to such use; and it is the object of the invention to provide an easily and quickly adjusted clamp of this kind, as well as one embodying certain novel features of construction to be hereinafter described and claimed.

In order that the invention may be better understood, reference is had to the accompanying drawing forming a part of this specification, in which drawing—

Figure 1 is an elevation of the clamp, Fig. 2 is a cross-section on the line 2—2 of Fig. 1, Fig. 3 is a cross-section on the line 3—3 of Fig. 2.

Referring specifically to the drawing, 5 denotes a shank which carries at one of its ends a fixed jaw 6 coöperating with an adjustable jaw carried by the shank. Slidably mounted on the shank is an arm 7 carrying at its extremity a screw 8 formed at one of its ends with a head 9 which is the adjustable jaw of the clamp. The arm 7 extends parallel to the fixed jaw 6 and the screw 8 extends at a right angle to said jaw, so that by operating said screw, the head 9 may be carried toward or from the fixed jaw, to grip or release the work. The arm 7 is slidable lengthwise on the shank 5 toward and from the fixed jaw 6 in order that the clamp may be quickly adjusted to the work.

The following means are provided for locking the arm on the shank: Intermediate the ends of the arm 7 is a threaded aperture 10 into which screws a thumb screw 11 having a shoulder 12. On the shank of the thumb screw, between the shoulder 12 and the bottom of the arm 7 is loosely mounted a washer 13 having its top face, on one side, cut away on a slant to form an inclined surface 14. In the bottom of the arm is a recess 15 in which the washer 13 seats. On one side, the wall of this recess has an opening 16 which is for a purpose to be presently described. Between the inner edge of the shank 5 and the incline 14 is located a slidable key 17 comprising a flat strip which is beveled at one of its ends to fit the incline 14, and has at its other end a notch 18, so that it may fit over the inner edge of the shank. The beveled end of the key passes through the opening 16. The inner end of the arm 7 is enlarged and has an opening through which the shank loosely extends, and said enlarged inner end of the arm also extends slightly below the plane of the bottom of the arm and has a recess 19 through which the notched end of the key extends into contact with the shank, the inner edge of the latter fitting in the notch 18. The arm 7 is locked on the shank 5 by advancing the screw 11. The incline 14 and the bevel of the key 17 run in such directions that when the screw is operated as stated, the washer 13 pushes the key 17 sidewise toward the shank, the screw being operated until the key is tightly wedged against the shank, whereupon the arm is securely locked to the latter. A slight turn of the screw in the opposite direction, loosens the key sufficiently to release the arm.

It will be seen from the foregoing that the clamp can be quickly adjusted, and after the herein-described adjustment of the arm 7 is made, final adjustment, if necessary, may be readily made by operating the screw 8.

I claim:

A clamp comprising a shank having a fixed jaw, an arm slidable on the shank toward and from the fixed jaw and carrying a jaw coöperating therewith, said arm having a recess the wall of which has an opening on one side, a shouldered screw threaded into the recessed portion of the arm, a washer seating in the recess and engageable by the shoulder of the screw, said washer being cut away on one side at a slant to form a flat incline, and a slidable key engageable at one of its end with the shank, and having its other end beveled and extending through the opening into the aforesaid recess into engagement with the incline of the washer.

In testimony whereof I affix my signature in presence of two witnesses.

PETER ZAWADZKI.

Witnesses:
 JOSEF LITA,
 H. G. BATCHELOR.

Copies of this patent may be obtained for five cents each, by addressing the "Commissioner of Patents. Washington, D. C."